United States Patent
Oswald

(10) Patent No.: US 6,704,792 B1
(45) Date of Patent: Mar. 9, 2004

(54) SIMPLE NETWORK MANAGEMENT PROTOCOL (SNMP) SUN-AGENT INTERFACE

(75) Inventor: Tom Oswald, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/371,660

(22) Filed: Aug. 10, 1999

(51) Int. Cl.[7] .............................................. G06F 15/16
(52) U.S. Cl. ...................................... 709/236; 370/474
(58) Field of Search ............................... 709/202, 236; 370/474, 476

(56) References Cited

U.S. PATENT DOCUMENTS

| | | | | | |
|---|---|---|---|---|---|
| 5,303,302 A | * | 4/1994 | Burrows | ..................... | 713/161 |
| 5,404,532 A | * | 4/1995 | Allen et al. | ................. | 713/200 |
| 5,485,460 A | * | 1/1996 | Schrier et al. | ............. | 370/94.1 |
| 5,982,772 A | * | 11/1999 | Oskouy | .................... | 370/395.7 |
| 6,032,197 A | * | 2/2000 | Birdwell et al. | ............ | 709/247 |
| 6,088,355 A | * | 7/2000 | Mills et al. | .................. | 370/392 |
| 6,161,207 A | * | 12/2000 | Lockhart et al. | ............ | 370/473 |
| 6,480,499 B1 | * | 11/2002 | Richards et al. | ............ | 370/412 |
| 2001/0004745 A1 | * | 6/2001 | Villalpando | | |
| 2001/0044822 A1 | * | 11/2001 | Nishio | ........................ | 709/223 |

* cited by examiner

Primary Examiner—Glenton B. Burgess
Assistant Examiner—Kimberly Flynn
(74) Attorney, Agent, or Firm—Marger Johnson & McCollom, PC

(57) ABSTRACT

A method for rebuilding network agent messages. The method includes the steps of receiving partial network agent message, rebuilding the message and sending it to a network agent. The network message could be a protocol data unit under the simple network management protocol. The invention allows the network to function fully even when network interfaces do not pass complete network agent messages.

3 Claims, 1 Drawing Sheet

SIMPLE NETWORK MANAGEMENT PROTOCOL (SNMP) SUN-AGENT INTERFACE

BACKGROUND OF THE INVENTION

1. Field of the Invention

This invention relates to network interfaces, more specifically, those network interfaces that use the Simple Network Management Protocol (SNMP).

2. Background of the Invention

The Simple Network Management Protocol (SNMP) was originally developed in 1988 for internetwork management. One of its main goals was to provide a simple design that would facilitate its widespread and rapid deployment. SNMP has several other advantages, among those is the separation between the management architecture and the hardware device architectures. This allows for a much wider base of supported devices.

Network management systems such as SNMP typically have two primary elements, a manager and agents. Managers are also referred to as applications. These managers contain software that runs on a network management station, such as a PC or workstation. The manager software implements the protocols used to exchange data with the network agents. The managers send out queries to gather information about the status, configuration and performance, as well as other parameters of external devices.

The external devices, sometimes referred to as network components. The network components contain the agents that receive to the queries from the manager, gather the necessary information and respond to the manager. The agent is a software element. These queries and responses allow the network administrator to access and manage objects in the network.

In SNMP, the messages have a predefined format called a protocol data unit, or PDU. There are five different types of message sent in the PDU format. The manager issues three types of messages to retrieve object variables: GetRequest messages, GetNextRequest messages, and SetRequest messages. The agent acknowledges all three types of messages with a GetResponse message, which passes back to the manager. A fifth type of message is called a trap, in which the agent notifies the manager of some type of error condition, such as a value that exceeds a predefined threshold.

Problems can occur if the format of the message is somehow corrupted or inaccurate. For example, if the manager sending the agent does not send a complete PDU, the agent does not know how to respond. Currently, no practical method exists to adapt to problems caused by incomplete PDUs. Therefore, a method is needed that corrects this problem and allows the network to continue to function.

SUMMARY OF THE INVENTION

One aspect of the invention is a method of reconstructing a partial network agent message. The method involves receiving a partial network agent message from a network interface, rebuilding the message and sending the rebuilt message to a network agent. In one embodiment of the invention, the partial network agent message is a protocol data unit under the simple network management protocol (SNMP). In alternative embodiments of the invention, the network is designed with knowledge that the network agent message is incomplete, or the incomplete message is detected during network operation.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
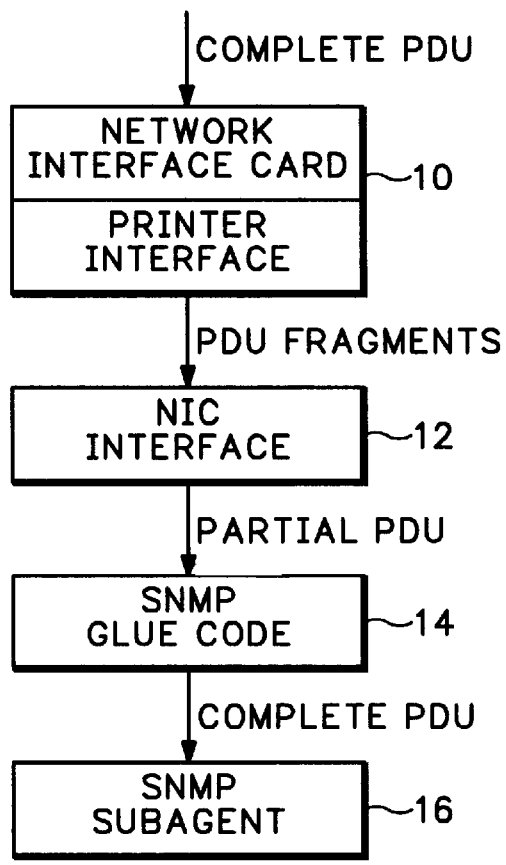
FIG. 1 shows a flow chart of one embodiment of a method to handle incomplete protocol data units in a network management system.

One embodiment of a method to handle incomplete messages between managers and agents in a network management system is shown in FIG. 1. It must be noted that the specifics of this example use SNMP protocols and terminology merely as examples. It is in no way intended to limit the application of the invention, but is only for discussion purposes. Further, a printer is used as an example of the network component, again only for discussion purposes.

In FIG. 1, the network interface card, or NIC, has as part of its structure, a printer interface software element in step 10. The NIC interface receives a query from the network manager and receives a PDU message from the manager that is complete at step 12, but the NIC tears it apart and only passes on part of the PDU. In this example, it was known at the design phase of the network that the PDU would be incomplete. This can be determined from several places, including the specifications provided by vendors of either the software or the hardware used in the network.

In alternative embodiments, identification of an incomplete PDU may be necessary. Additionally, there may be further analysis of incomplete PDUs to determine what information is provided and how much adjustment will be necessary. However, for this specific example, the discussion will assume that the PDU was known to be incomplete at design of the system.

Once the incomplete PDU is received, the method needs to handle the incomplete PDU to allow the network to function correctly. In this example, this is at step 14 and a software element referred to here as SNMP glue code will perform the handling and adjustment of the PDU. This will be discussed in more detail further in the description.

The process of handling the incomplete PDU ends at step 16, where a complete PDU has passed to the SNMP sub-agent from the SNMP glue code. At this point, the network can return to its normal functions with a complete PDU.

In order to more clearly understand the restructuring of a network management message such as a PDU, it is helpful to study the specifics of such a message. In keeping with the SNMP environment used in the above examples, a table below gives a format for an SNMP PDU.

In order to understand the table, however, some of the terms discussed in the comments may require further explanation. References will be made to both ASN.1 and BER, two hand-in-hand methods for coding and handling of the information to be transmitted and received.

ASN.1 stands for Abstract Syntax Notation, version 1. It is a language for describing structured information, typically to be transmitted across an interface or communication link. The data types of ASN.1 are encoding using Basic Encoding Rules (BER). BER allows automatic derivation of the transfer syntax for every abstract syntax defined using ASN.1.

ASN.1 is a hierarchical structure, which is followed by BER. They both operate on a Tag, Length, Value, or Identifier, Length, Contents (ILC) scheme. In the case of BER, the scheme is often referred to as Type-Length-Value (TLV). Many other encoding schemes use similar structures. The encoding schemes ensure that the information transmitted is in the proper format. For discussion purposes, the TLV format will be assumed.

In the TLV format, the type portion conveys several pieces of information: the tag class of the value, the tag number and the form of the encoding, either primitive or structured. The length portion allows the system to identify the end the contents, thereby ensuring that all the contents are received and not mixed in with following terms. The value is the actual contents being conveyed, the substance of the encoding.

BER uses unique identifiers as part of the type portion, thereby identifying data types. The identifier calls to the particular data type being transmitted under ASN.1. The identifiers are divided into four classes, using the $8^{th}$, $7^{th}$ and $6^{th}$ bits of the octet string. This is shown in the following table.

| Bit Position | | | | | | | | Data Type | Description/Comments |
|---|---|---|---|---|---|---|---|---|---|
| 8 | 7 | 6 | 5 | 4 | 3 | 2 | 1 | | |
| 0 | 0 | | | | | | | Universal | Available for use in any protocol [INTEGER, OCTECT, OBJECT ID, NULL are universal data types, SEQUENCE is a universal constructor] |
| 0 | 1 | | | | | | | Application | Available within a specific application. For example, IpAddress data types are available for TCP/IP network management applications |
| 1 | 0 | | | | | | | Context-specific | Contained within a larger data type. It has a unique meaning within the context of one of the above data types |
| 1 | 1 | | | | | | | Private | Included for use of proprietary data types by organizations |
| | | 0 | | | | | | Primitive data type | |
| | | 1 | | | | | | Constructed | |

The remaining bits designate a numeric tag associated with the particular data type defined by the first three bits.

These tags, their class names and types uniquely identify the variables in the protocol. The identifier tags used in the PDU table below are shown as follows.

| Tag | Name |
|---|---|
| 02 | INTEGER |
| 04 | OCTET STRING |
| 05 | OBJECT IDENTIFIER |
| 06 | NULL |
| 30 | SEQUENCE |

The above terminology and tags are used in the PDU, shown in the table below.

| Field | Code | Comment |
|---|---|---|
| | | SNMP Message |
| Tag | 30h | Sequence |
| Length | arbitrary | Length of following value, BER |
| Value | | |
| | | Version |
| Tag | 02h | Integer |
| Length | 01h | length of Value |
| Value | 00 or 01h | 0 for SNMP, 1 for SNMPv2 |
| | | Community |
| Tag | 04h | Octet string |
| Length | arbitrary | length of the following value, BER |
| Value | arbitrary | ASCII-coded alpha string - 'public' is typical |
| | | Command |
| Tag | A0h-A7h | Identifies type of message Get, GetNext, etc. |
| Length | arbitrary | length of the following value, BER |
| Value | | |
| | | Request ID (provided by manager to correlate response) |
| Tag | 02h | Integer |
| Length | arbitrary | length of the following value, BER |
| Value | | BER encoded value provided by manager application |
| | | Error Status (filled in if there is an error in response) |
| Tag | 02h | Integer |
| Length | 01h | length of the value, a 1-byte enumeration |
| Value | 00h-05h | binary coded enumeration |
| | | Error Index (pointer to variable that caused problem) |
| Tag | 30h | Sequence |
| Length | arbitrary | length of the following value, BER |
| Value | | |
| | | Variable Binding (list of Object ID variable pairs) |
| Tag | 30h | Sequence |
| Length | arbitrary | length of the following value, BER |
| Value | | |
| | | Object 1 |
| Tag | 30h | Sequence |
| Length | arbitrary | length of the following value, BER |
| Value | | |

-continued

| Field | Code | Comment |
|---|---|---|
| | | Object ID |
| Tag | 06h | OID ASN.1 type code |
| Length | arbitrary | length of the following value, BER |
| Value | arbitrary | OID (example 1.3.6.1.2.1.1.3.0) |
| | | Object Value |
| Tag | 05h | ASN.1 type null code, agents writes actual code |
| Length | 00h | Management application put in 0-length and no value |
| Value | | Agent puts in correct length and value |
| | | ... |
| | | Object N |
| Tag | | Sequence |
| Length | | length of the following value, BER |
| Value | | |
| | | Object ID |
| Tag | | OID ASN.1 type code |
| Length | | length of the following value, BER |
| Value | | OID (example 1.3.6.1.2.1.1.3.0) |
| | | Object Value |
| Tag | | ASN.1 type null code; agents writes actual code |
| Length | | Management application put in 0-length and no value |
| Value | | Agent puts in correct length and value |

Having seen the specification of one example of a complete PDU, it is possible now to discuss a method for construction of a complete PDU from a partial PDU. The partial PDU contains different portions of a complete PDU depending upon the type of message being sent. In a Get message, the PDU contains a BER-encoded OID (object identifier). In a Set message, the partial PDU contains a BER-encoded OID, a BER-encoded Type, the Length that is not BER-encoded, and the Value that is not BER-encoded. These elements are used to rebuild and complete the PDU.

Figure 2:
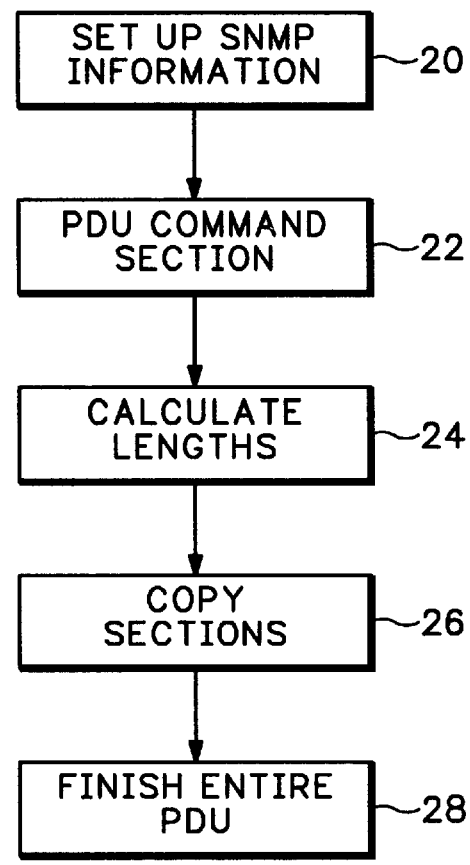
FIG. 2 shows a flow chart of one embodiment of a process to generate a complete protocol data unit from an incomplete one.

Referring now to FIG. 2 and the PDU table above, one embodiment of a method for reconstructing a partial PDU begins at step 20 with set up of the SNMP information. The SNMP or network information provides the necessary parameters for the version of the network management code being used, such as SNMPv1, SNMPv2, and the network community. The network community identifies the community allowed to access the particular message. If the requester is not a member of the proper network community, it is denied access to this particular message. In most cases, however, the community is 'public.'

Once the network environment information is set up, the command section information is processed in step 22. In this example, the command section information was provided but known at the design phase to not be in the previously discussed TLV format. As shown in the table above, the command section identifies the type of message being transmitted. The codes A0–A7 define different types of messages, as shown below.

| Code | Message Type |
|---|---|
| A0 | GetRequest PDU |
| A1 | GetNextRequest PDU |
| A2 | GetResponse PDU (for SNMPv1) |
| A3 | SetRequest PDU |

-continued

| Code | Message Type |
|---|---|
| A4 | Trap PDU |
| A5 | GetBulkRequest PDU |
| A6 | InformRequest PDU |
| A7 | SNMPv2 Trap PDU |

In addition to process the actual command portion of the PDU, the remaining pieces of the command section must be processed. This includes the Request ID section, which identifies the number of the request, the Error Status section, which identifies if there is an error, and the Error Index section, which identifies the variable giving rise to the problem if there is one.

In step 24, the lengths of the variable binding sections must be calculated. As can been seen by the PDU table, there can be n number of variable bindings and they can be of varying lengths. However, in order for the process from FIG. 1 to handle the PDU, the lengths must be included, as discussed above. Once all of the parameters for all of the objects have been identified and decoded as necessary to determine the lengths, these values are stored to be entered into the completed PDU.

In step 26, all of the previous information is copied into a framework of a complete PDU in the proper places and in the proper format. For example, the command section information was provided but not in the SNMP-desired format of TLV. Therefore, this information must be copied into the proper format, such as TLV, into the proper sequence of the complete PDU framework. Once all the copying is performed, a complete PDU has been populated from the partial PDU information previously received as shown in step 28.

At this point, the discussion returns to FIG. 1. Now that a complete PDU has been constructed, the process can continue in normal mode. In the example of FIG. 1, an SNMP subagent spawned by the NIC interface uses the completed PDU. However, this is merely an example, and the completed PDU could be used in any number of functions within a network management system.

Similarly, while the SNMP-specific examples have been used to this point, they are merely intended as examples. The expansion of these examples could be performed into any network management context. In general network terms, a partial PDU would translate to a partial or corrupted network agent message in non-SNMP network management systems. The SNMP information set up as discussed with reference to FIG. 2 would translate into any specific information necessary for a particular network management environment. The various portions of the PDU table would have analogous portions to other network management message formats.

Thus, although there has been described to this point a particular embodiment for a method and structure for handling incomplete network management messages, it is not intended that such specific references be considered as limitations upon the scope of this invention except in-so-far as set forth in the following claims.

What is claimed is:

1. A method of reconstructing a partial network agent message used in a network management protocol, the method comprising:

processing information about a command section of said partial network agent message into proper network agent message form;

calculating lengths of parameters in said command section necessary to complete said network agent message;

copying and encoding said sections from said partial network agent message to a framework of a complete network agent packet; and completing said framework of said complete network agent packet with said information about said network management protocol, said command section, and said lengths.

2. The method as claimed in claim 1 wherein said proper network agent message form is type-length-value format.

3. The method as claimed in claim 1 wherein said network protocol is simple network management protocol.

* * * * *

UNITED STATES PATENT AND TRADEMARK OFFICE
CERTIFICATE OF CORRECTION

PATENT NO. : 6,704,792 B1
DATED : March 9, 2004
INVENTOR(S) : Oswald

It is certified that error appears in the above-identified patent and that said Letters Patent is hereby corrected as shown below:

Title page, Item [54] and Column 1, line 2,
Title, "(SNMP) SUN-AGENT" should read -- (SNMP) SUB-AGENT --.

Title page,
Item [56], References Cited, U.S. PATENT DOCUMENTS, insert:
-- 5,937,169    8/1999        Connery et al.        709/250 --.

Column 3,
Line 11, "the end the contents," should read -- the end of the contents, --.
Line 16, "identifying data types." should read -- identifying the data types. --.

Column 5,
Line 11, "null code, agents" should read -- null code; agents --.

Signed and Sealed this

Twenty-seventh Day of December, 2005

JON W. DUDAS
*Director of the United States Patent and Trademark Office*